United States Patent [19]

Williams, Jr. et al.

[11] Patent Number: 4,608,406
[45] Date of Patent: Aug. 26, 1986

[54] STABLE AQUEOUS EPOXY RESIN DISPERSIONS

[75] Inventors: Paul R. Williams, Jr.; Russell V. Burt; Ronald Golden, all of Louisville, Ky.

[73] Assignee: Celanese Corporation, New York, N.Y.

[21] Appl. No.: 724,439

[22] Filed: Apr. 18, 1985

[51] Int. Cl.$^4$ .......................... B05D 3/00; C08L 63/02
[52] U.S. Cl. .................................... 523/424; 523/402; 523/403
[58] Field of Search .................. 523/424, 403, 402

[56] References Cited

U.S. PATENT DOCUMENTS 4,315,044  2/1982  Elmore et al. ................. 427/386
4,539,347  9/1985  De Gooyer ..................... 523/404

Primary Examiner—Ronald W. Griffin
Attorney, Agent, or Firm—Herbert P. Price

[57] ABSTRACT

A stable aqueous epoxy resin dispersion, useful as a coating composition when cured, is made by dispersing in water the reaction product of a diglycidyl ether of a dihydric phenol, a dihydric phenol, a diglycidyl ether of a polyoxyalkylene glycol and an alkyl phenol-formaldehyde novolac resin.

11 Claims, No Drawings

STABLE AQUEOUS EPOXY RESIN DISPERSIONS

BACKGROUND OF THE INVENTION

The field of art to which this invention pertains is coating compositions made from aqueous epoxy dispersions.

Aqueous dispersions of Bisphenol A type epoxy resins which exhibit long term stability under ambient storage conditions are described in U.S. Pat. No. 4,315,044. Such stable dispersions are comprised of an aqueous medium having dispersed therein 50–70 weight percent of a self-emulsifying epoxy resin. The epoxy resin is made from 40–90 parts by weight of a diglycidyl ether of a dihydric phenol, 5–35 parts by weight of a dihydric phenol and 2–15 parts by weight of a diglycidyl ether of a polyoxyalkylene glycol, said epoxy resin having a molecular weight of about 500 to about 20,000. The dispersion can also contain 1–25 weight percent based on resin solids of a water-immiscible $C_8$–$C_{20}$ aliphatic monoepoxide reactive diluent.

SUMMARY OF THE INVENTION

This invention in one aspect is directed to stable aqueous dispersions of epoxy resin compositions wherein the epoxy resin composition is modified with an alkyl phenol-formaldehyde novolac resin in which the alkyl group contains about 4 to about 12 carbon atoms. In another aspect this invention pertains to coating compositions made from the aqueous dispersions.

The stable aqueous epoxy resin dispersions of this invention are comprised of (1) an aqueous medium; and (2) between about 50 to about 70 weight percent of self-emulsifying epoxy resin which is the addition reaction product of (a) 40–90 parts by weight of a diglycidyl ether of a dihydric phenol; (b) 5–35 parts of a dihydric phenol; (c) 2–15 parts by weight of a diglycidyl ether of a polyoxyalkylene glycol; and (d) 2 to 15 parts by weight of an alkyl phenol-formaldehyde novolac resin wherein the molecular weight of the epoxy resin is in the range of about 1000 to about 20,000.

The stable dispersions can be modified by the addition of about 1 to about 25 weight percent of an aliphatic monoepoxide reactive diluent.

In order to improve freeze-thaw stability, the stable aqueous epoxy resin dispersions of this invention can be modified by the addition of about 5–20 weight percent, based on resin solids weight, of a water-miscible solvent which, preferably, is a 2 to 8 carbon glycol or glycol ether.

Water-borne coating compositions are made from the aqueous epoxy resin dispersions of this invention by adding to the dispersions polyamine curing agents wherein the ratio of active amine hydrogens to epoxy groups is in the range between about 0.5 to 2:1.

DESCRIPTION OF THE INVENTION

The diglycidyl ethers of dihydric phenols useful in this invention are the reaction products of dihydric phenols and epihalohydrins, which are described in U.S. Pat. Nos. 2,582,985; 2,615,007 and 2,633,458. Suitable dihydric phenols are those which contain no groups other than phenolic groups which are reactive with the epihalohydrins. Examples of such dihydric phenols include 2,2-bis(4-hydroxyphenyl)propane, 2,2-bis(3-bromo-4-hydroxyphenyl)propane, 2,2-bis(3,5-dichloro-4-hydroxyphenyl)propane, 2,2-bis(3-chloro-4-hydroxyphenyl)propane, bis(4-hydroxyphenyl)methane, bis(4-hydroxyphenyl)sulfone, bis(4-hydroxyphenyl)sulfide, resorcinol, hydroquinone, and the like. The preferred dihydric phenol is 2,2-bis(4-hydroxyphenyl)propane (Bisphenol A) for reasons of cost and availability.

Optionally at least a portion of the diglycidyl ether of a dihydric phenol component can be replaced with a diglycidyl ether of a hydrogenated dihydric phenol derivative. For example, the said diglycidyl ether of dihydric phenol can have up to essentially 100 percent of its weight substituted by a diglycidyl alicyclic ether such as 2,2-bis(4-hydroxycyclohexyl)propane or bis(4-hydroxycyclohexyl)methane. Useful diglycidyl ethers have epoxide equivalent weights of about 110 to about 300 and, preferably, about 170 to about 200.

The dihydric phenols which are reacted with the diglycidyl ethers are the same as those listed hereinbefore.

An important feature of the stable aqueous dispersions of the present invention is the incorporation of a diglycidyl ether of polyoxyalkylene component into the curable epoxy resin vehicle of the aqueous systems.

The preferred diglycidyl ether of polyoxyalkylene glycols are those having a molecular weight in the range between about 4000–20,000. The said glycidyl ethers are conveniently prepared by reacting epichlorohydrin with a selected polyoxyalkylene glycol, in a molar proportion which provides a glycidyl ether reaction product having more than one up to two glycidyl groups per molecule.

The polyoxyalkylene glycol reactant after dehydrohalogenation with caustic is soluble or at least partially soluble in water. Polyalkylene glycol compounds are prepared by the condensation of alkylene oxide with a suitable polyhydric alcohol. Illustrative of alkylene oxides are ethylene oxide and propylene oxide and mixtures thereof. Illustrative of polyhydric alcohols are aliphatic alcohols such as ethylene glycol, 1,3-propylene glycol, 1,2-propylene glycol, 1,4-butylene glycol, 1,3-butylene glycol, 1,2-butylene glycol, 1,5-pentandiol, 1,4-pentandiol, 1,3-pentandiol, 1,6-hexandiol, 1,7-heptandiol, 2,2-bis(4-hydroxycyclohexyl)propane, and the like.

Preferred polyoxyalkylene glycols are those prepared by the reaction of ethylene oxide and/or propylene oxide with a dihydric aliphatic alcohol, e.g., ethylene glycol. Illustrative of polyoxyalkylene glycols are commercial Pluronic (BASF-Wyandotte) type products which are block copolymers of ethylene oxide and propylene oxide of about 5000–10,000 molecular weight, containing from about 50 to about 90 weight percent ethylene oxide and about 10 to about 50 weight percent propylene oxide.

The novolac resins useful in this invention are those made from alkyl phenols and formaldehyde wherein the alkyl group contains 4 to 12 carbon atoms. Such alkyl phenols include tertiary-butyl phenol, hexyl phenol, octyl phenol, nonyl phenol and dodecyl phenol. A preferred alkyl phenol is nonyl phenol. Novolac resins are made by reacting the phenol with formaldehyde under acid conditions. In novolac resins the phenol moieties are linked together through methylene bridges. Novolac resins contain no reactive methylol groups. Novolac resins useful in this invention have molecular weights within the range of about 1000 to about 5000 and melting points of about 50° to about 200° C. Cured coatings made from the compositions of this invention show dramatic improvements in flexibility, solvent resistance, salt spray resistance and humidity resistance over coatings made from compositions which do not contain the alkyl phenol novolac resins.

The highly preferred stable aqueous epoxy resin dispersions of the present invention are those which contain a water-immiscible $C_8$–$C_{20}$ aliphatic monoepoxide reactive diluent component. The said monoepoxide component can contain alicyclic and aromatic structures, as well as halogen, sulfur, phosphorus, and other such heteroatoms.

Illustrative of monoepoxide reactive diluents are epoxidized unsaturated hydrocarbons such as decene and cyclohexene; glycidyl ethers of monohydric alcohols such as 2-ethylhexanol, dodecanol and eicosanol; glycidyl esters of monocarboxylic acids such as hexanoic acids; acetals of glycidaldehyde; and the like. The preferred reactive diluent is the glycidyl ether of monohydric $C_8$–$C_{17}$ aliphatic alcohols.

The presence of a water-immisible $C_8$–$C_{20}$ aliphatic monoepoxide reactive diluent in an aqueous epoxy resin dispersion has a beneficial effect on the properties of the aqueous dispersion. The said water-immiscible reactive diluent appears to function by coating the particles of epoxy resin solids and thereby providing the aqueous dispersion with improved shear, freeze-thaw resistance, shelf viscosity stability, and paint gloss.

Also, since the reactive diluent is epoxy functional, it becomes incorporated into the film-forming substrate during the subsequent room temperature curing of the aqueous dispersion composition after it has been blended with a curing agent and coated on a surface. The total quantity of reactive diluent contributes to the calculated proportion of non-volatiles in the dispersion composition.

In order to obtain improved freeze-thaw stability of the aqueous epoxy resin dispersions of this invention, water-miscible glycols or glycol ethers preferably can be added to the dispersions in the amount of about 5 to about 20 weight percent based on the total resin solids weight of the dispersion. Examples of suitable glycols and glycol ethers are those having 2 to 18 carbon atoms. Such glycols and glycol ethers include ethylene glycol, propylene glycol, monomethyl ether of ethylene glycol, monoethyl ether of ethylene glycol, monobutyl ether of ethylene glycol, monomethyl ether of propylene glycol, monopropyl ether of ethylene glycol, monoethyl ether of propylene glycol, monobutyl ether of propylene glycol, monomethyl ether of diethylene glycol, monoethyl ether of diethylene glycol, monobutyl ether of diethylene glycol and the like.

In preparing the stable aqueous epoxy resin dispersions of this invention, the glycidyl ether of a dihydric phenol, the dihydric phenol, the diglycidyl ether of the polyoxyalkylene glycol and the novolac resin are heated in the presence of a catalyst, e.g., potassium hydroxide, triphenyl phosphine, benzyl dimethylamine and the like, to a temperature of about 240°–300° F. with stirring. The exothermic reaction will then raise the temperature to about 330°–400° F. When the exotherm is over, the temperature is maintained at 300°–350° F. for about 1–3 hours. Glycol or glycol ether can then be added, if desired. Water is then slowly added, first forming a water-in-oil emulsion. With continued addition of water, the emulsion will invert to an oil-in-water emulsion. An aliphatic monoepoxide reactive diluent can now be added, if desired.

The aqueous epoxy resin dispersions of this invention have a maximum particle size of about 3 microns. The resin solids are generally at about 50–70 weight percent, but, of course, can be lower, if desired, simply by diluting the dispersion with water. Generally, the dispersion at 50–60 weight percent solids will have a Brookfield viscosity of 1000 to 20,000 cps.

A room temperature curable water-borne coating composition is prepared by admixing a stable epoxy dispersion composition as described above with an epoxy-interacting curing vehicle, such as a polyamine curing agent. The ratio of active amino hydrogens to epoxy groups in the admixture is in the range of 0.5–2:1 and, preferably, is in the range between about 0.8–1.5:1. For purposes of industrial maintenance paint compositions, the amino hydrogens must be sufficiently reactive to effect crosslinking interaction with the epoxy groups at ambient temperatures.

Suitable polyamine curing agents are those which are soluble or dispersible in water and which contain more than 2 active hydrogen atoms per molecule. Examples of such curing agents are alkylene polyamines represented by the formula

$H_2NR(NHR)_xNH_2$ wherein R is an alkylene radical containing 2 to 4 carbon atoms and x has the value of 0 to 5. Such alkylene polyamines are ethylene diamine, diethylene triamine, triethylene tetramine, tetraethylene pentamine, pentaethylene hexamine, propylene diamine, dibutylene triamine, and the like. Other polyamine curing agents are the polyamido amines, which are reaction products of alkylene polyamines and fatty acids. Such polyamidoamines are well known in the art and are described in U.S. Pat. Nos. 2,705,223; 2,811,495 and 2,899,397, which patents are hereby incorporated by reference. Other polyamine curing agents are the adducts of polyamines and epoxy compounds, such as those described in U.S. Pat. Nos. 2,651,589; 2,864,775; 4,116,900 and commonly assigned pending patent application, Ser. No. 652,581, filed Sept. 20, 1984, now U.S. Pat. No. 4,539,347, issued Sept. 3, 1985, which patents and application are hereby incorporated by reference.

Other curing agents can be used in the composition of this invention, particularly when the coatings made from the compositions are heated to effect a cure. Examples of such additional curing agents are the aminoplast and phenolplast resins. Suitable aminoplast resins are the reaction products of urea and melamines with aldehydes further etherified in some cases with an alcohol. Examples of aminoplast resin components are urea, ethylene urea, thiourea, melamine, benzoguanamine and acetoguanamine. Aldehydes include formaldehyde, acetaldehyde and propionaldehyde. The aminoplast resins can be used in the alkylol form but, preferably, are utilized in the ether form wherein the etherifying agent is a monohydric alcohol containing from 1 to 8 carbon atoms. Examples of suitable aminoplast resins are methylol urea, dimethoxymethylol urea, butylated polymeric urea-formaldehyde resins, hexamethoxymethyl melamine, methylated polymeric melamine-formaldehyde resins and butylated polymeric melamine-formaldehyde resins.

Phenolplast resins are the reaction products of phenols and aldehydes which contain reactive methylol groups. These compositions can be monomeric or polymeric in nature depending on the molar ratio of phenol to aldehyde used in the initial condensation reaction. Examples of suitable phenols are phenol, o, m or p-cresol, 2,4-xylenol, 3,4-xylenol, 2,5-xylenol, cardanol, p-tert-butyl phenol, and the like. Useful aldehydes are formaldehyde, acetaldehyde and propionaldehyde. Particularly useful phenolplast resins are polymethylol phenols wherein the phenolic group is etherified with an alkyl, e.g., methyl or ethyl group.

An aqueous epoxy resin paint composition of the present invention may further contain additives conventionally employed in coating technology, such as organic pigments, inorganic pigments, surfactants, thickeners, and the like.

In normal usage, after a water-borne paint composition is prepared using a polyamine curing agent, it is coated on a substrate by roller, spray, dip, doctor blade, or similar application means. The film-formation and curing is accomplished by air-drying under ambient temperature conditions.

As a further embodiment, the present invention provides water-borne epoxy compositions which have properties suitable for use as a one-package coating system. This type of coating system is prepared by blending a stable epoxy dispersion composition as described above with a crosslinking agent which is substantially unreactive with the epoxy groups at room temperature. In this type of system, crosslinking is accomplished by baking an applied coating at an elevated temperature.

In addition to the aminoplast and phenolplast curing agents described hereinbefore, other crosslinking agents suitable for the one-package coating systems are novolacs, dibasic carboxylic acids, carboxyl phthalocyanines, dimer and trimer fatty acids, aliphatic and aromatic polycarboxylic acids; acid containing acrylic resins such as polyacrylic and polymethacrylic acids, anhydrides, amides and miscellaneous nitrogen compounds such as dicyandiamide and hydrazides. The various curing agents useful with epoxy resins are discussed in Lee and Neville's "Handbook of Epoxy Resins", McGraw-Hill (1967).

A present invention one-package coating system as described above can be cured by heating a coated article at a temperature between about 90°–250° C. for a period of time between about 5 minutes and two hours sufficient to effect a thermosetting cure.

The following examples describe the invention in more detail. Parts and percentages, unless otherwise indicated, are parts and percentages by weight.

EXAMPLE 1

To a suitable reactor were added 702 parts of the diglycidyl ether of Bisphenol A having an epoxide equivalent weight of 190, 208 parts of Bisphenol A and 50 parts of a diglycidyl ether of Pluronic F88 (BASF-Wyandotte). Pluronic F88 is a block copolymer of 80 weight percent ethylene oxide and 20 weight percent propylene oxide with the polyoxypropylene block in the middle with terminal polyoxyethylene blocks, said block copolymer having an average molecular weight of 10,800. Heat and agitation were applied raising the temperature to 165° F. Triphenyl phosphine, 0.3 part, was added and the temperature was raised to 350° F. Heating was discontinued allowing the temperature to rise to 380° F. from the exothermic reaction. The temperature was then allowed to drop to 240° F. A nonylphenol-formaldehyde novolac resin, 20 parts, was then added. Heat was reapplied raising the temperature to 295° F. Propylene glycol monomethyl ether, 160 parts, was added over a 20 minute period with the temperature dropping to 265° F. The temperature was then raised to 290° F. over a one hour period. The temperature was lowered to 215° F. Demineralized water, 167 parts, was added over 30 minutes with good agitation with the temperature dropping to 130° F. After 25 minutes, 40 parts of water were added. After 20 minutes, an additional 40 parts of water were added. After 15 minutes, 20 parts of water were added. After 25 minutes, 35 parts of water were added. The temperature during these additions was raised to 170° F. After the final addition of water, the temperature was allowed to drop to 140° F. over a 40 minute period. During this period, the dispersion inverted from a water-in-oil emulsion to an oil-in-water dispersion. Increased agitation with heating to 155° F. was continued for 30 minutes. A glycidyl ether of a mixed $C_8$–$C_{10}$ alcohol having an epoxide equivalent weight of 220–235, 20 parts, was then added. The particle size of the dispersed particles was in the range of 2–3 microns. Additional water, 356 parts, was added over a 1 hour period.

The resulting stable dispersion had a Brookfield viscosity of 10,000 cps (Spindle #5 at 20 rpm) at 25° C.

EXAMPLE 2

To a suitable reactor were added 687 parts of the diglycidyl ether of Bisphenol A having an epoxide equivalent weight of 190, 203 parts of Bisphenol A, 50 parts of the diglycidyl ether of Pluronic F88 and 40 parts of the nonylphenol-formaldehyde resin described in Example 1. Heat was applied and at 155° F., 0.3 part of triphenyl phosphine was added. Agitation was begun and heating was continued. When the temperature reach 225° F., heating was discontinued and the temperature was allowed to rise to 350° F. due to the exothermic reaction. The temperature was held between 315° and 350° F. for 40 minutes. Propylene glycol monomethyl ether, 140 parts, was added over a 5 minute period, and the temperature was allowed to drop to 218° F. over a 15 minute period. Demineralized water, 187 parts, was slowly added with good agitation over a 40 minute period with the temperature dropping to 150° F. Agitation was continued for 20 minutes with the temperature dropping to 140° F. Water, 40 parts, was added. Agitation was continued for 30 minutes with the temperature rising to 150° F. Water, 14 parts, was added. After 15 minutes agitation, the temperature was 130° F. Water, 20 parts, was added. With this addition of water, the dispersion inverted from water-in-oil to oil-in-water. After 5 minutes agitation and heating, the temperature was 158° F. A glycidyl ether of mixed $C_8$–$C_{10}$ alcohols having an epoxide equivalent weight of 220–235, 20 parts, was added. After 25 minutes and with the temperature at 158° F., 417 parts of water were added over a one hour period with the temperature dropping to 125° F. After 20 minutes additional stirring and heating, the dispersion was filtered through an 80 mesh bag and stored.

The resulting stable dispersion had a Brookfield viscosity of 6,200 cps (No. 5 spindle, 20 rpm) at 25° C., and a solids content of 54.7%.

EXAMPLE 3

Using the same procedure described in Example 2, 664 parts of the diglycidyl ether of Bisphenol A having an epoxide equivalent weight of 190, 196 parts of Bisphenol A, 60 parts of the diglycidyl ether of Pluronic F88 and 60 parts of the nonylphenol-formaldehyde novolac resin described in Example 1 were reacted using 0.35 part of triphenyl phosphine as catalyst. An aqueous oil-in-water dispersion was made by adding to the above reaction product 140 parts of ethylene glycol monopropyl ether, 658 parts of demineralized water and 20 parts of the glycidyl ether of mixed $C_8$–$C_{10}$ alcohols having an epoxide equivalent weight of 220–235.

The resulting stable dispersion had a Brookfield viscosity of 9100 (No. 5 spindle, 20 rpm) at 25° C., a solids content of 54.5% and an average particle size of 1 micron. The dispersion exhibited no settling after 4 hours at 1000 rpm in a centrifuge and no settling after 6 months at 120° F.

EXAMPLE 4

A coating composition was prepared using the following formula:

| Part A | | |
|---|---|---|
| 442.2 parts | Example 3 | |
| 22.3 parts | High Flash Aromatic Hydrocarbon | |
| 22.7 parts | Ethylene Glycol Monopropyl Ether | |
| 93.8 parts | Water | |
| Part B | | |
| 135.1 parts | CMD J60-8290 Curing Agent[1] | |
| 4.0 parts | Defoamer[2] | |
| 250.0 parts | Rutile Titanium Dioxide | |
| 12.5 parts | Water | |
| High speed disperse to a texture of 10 P.C.S. | | |
| (Paint Club Scale) | | |
| 68.9 parts | Water | |
| 3.2 parts | Glacial Acetic Acid | |

[1]An adduct of a polyamine and a polyepoxide having a solids content of 60% in 95.5% ethylene glycol monopropyl ether and 4.5% glacial acetic acid, supplied by Celanese Specialty Resins.
[2]Patcote 847, supplied by C. J. Patterson Company.

Part A, 581.0 parts, was blended with 473.1 parts of Part B. After a 30 minute induction time, the resulting enamel was sprayed on metal panels, Bonderite 1000, to a dry film thickness of 2 mils. Performance data are listed in Table I. Pencil hardness was determined after 24 hours at room temperature and after 2 weeks at room temperature. All other properties were determined after 2 weeks at room temperature.

EXAMPLE 5

A coating composition was prepared from an epoxy dispersion which did not contain an alkyl phenol-formaldehyde novolac resin, i.e., a dispersion described in U.S. Pat. No. 4,315,044. The formula was as follows:

| Part A | |
|---|---|
| 411.6 parts | CMD-WC-55-3520 Epoxy Dispersion[1] |
| 27.8 parts | Mar and Slip Agent[2] |
| 13.7 parts | Water |
| Part B | |
| 160.0 parts | Epi-Cure WC-60-8537 Curing Agent[3] |
| 8.2 parts | Diethylene Glycol Monobutyl Ether Acetate |
| 4.0 parts | Defoamer[4] |
| 250.0 parts | Rutile Titanium Dioxide |
| High Speed Disperse to a texture of 10 P.C.S. | |
| 42.4 parts | Epi-Cure WC-60-8537 Curing Agent |
| 152.2 parts | Water |

[1]An epoxy dispersion having a solids content of 55% in 82.9% water and 17.1% ethylene glycol monoethyl ether, supplied by Celanese Specialty Resins.
[2]Michemlube 182 Wax Emulsion, Michelman Chemicals, Inc.
[3]An adduct of a polyamine and a polyepoxide having a solids content of 60% in 49% water, 38% ethylene glycol monoethyl ether and 13% glacial acetic acid, supplied by Celanese Specialty Resins.
[4]Troy Q-148, Troy Chemical Company.

Part A, 453.1 parts, was blended with 619.8 parts of Part B. After 30 minutes induction time, the resulting enamel was sprayed on metal panels, Bonderite 1000, to a dry film thickness of 2 mils. Performance data are listed in Table I.

EXAMPLE 6

A coating composition was prepared from a non-aqueous epoxy-amine resin system.

| Part A | | |
|---|---|---|
| 268.2 parts | Rutile Titanium Dioxide | |
| 2.0 parts | X-2280 Anti-Flooding Compound[1] | |
| 273.0 parts | Epi-Rez 2136[2] | |
| 12.9 parts | Syn-U-Tex 402[3] | |
| 43.2 parts | Diacetone Alcohol | |
| 33.4 parts | Methyl Isobutyl Ketone | |
| Part B | | |
| 112.5 parts | Epi-Cure 8515[4] | |
| 37.5 parts | Butyl Cellosolve | |
| 222.7 parts | Xylene | |

[1]Available from Imperial Color & Chemicals Dept., Hercules, Inc.
[2]A glycidyl ether of Bisphenol A having an epoxide equivalent weight of 500 at 75% solids in xylene, supplied by Celanese Specialty Resins.
[3]A butylated urea-formaldehyde resin at 60% solids in 87.5% butanol and 12.5% xylene, supplied by Celanese Specialty Resins.
[4]A polymeric amido-amine at 70% solids in xylene, supplied by Celanese Specialty Resins.

Part A, 632.7 parts, was blended with 372.7 parts of Part B. After a 1 hour induction period, the enamel was sprayed on metal panels, Bonderite 1000, to a dry film thickness of 2 mils. Performance data are listed in Table I.

TABLE I

| EXAMPLE | 4 | 5 | 6 |
|---|---|---|---|
| Pencil Hardness | | | |
| 24 Hrs. | H | 4B | 2B |
| 2 Weeks | H-2H | HB | 2H |
| Gloss (60° & 20°) | ALL COMPARABLE | | |
| Flexibility (in./lb.) | | | |
| Reverse | 160 | >10 | 160 |
| Direct | 160 | 10 | 100 |
| Methyl Ethyl Ketone Double Rubs | >400 | 75 | 300 |
| Chemical Resistance | DAY TO FAILURE | | |
| 5% Acetic Acid | 2 | 1 | 3 |
| 10% Nitric Acid | 2 | 1 | 7 |
| 10% Hydrochloric Acid | 2 | 1 | 7 |
| 10% Sulfuric Acid | 2 | 1 | 7 |
| 10% Sodium Hydroxide | >30 | >30 | >30 |
| Deionized Water | >30 | 7 | >30 |
| Salt Spray (Hrs.) | >1000 | 48 | >1000 |
| Humidity (Hrs.) | >1000 | 48 | >1000 |

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A stable epoxy resin dispersion composition comprising:
   (1) an aqueous medium; and
   (2) between about 50 to about 70 weight percent of self-emulsifying epoxy resin having a molecular weight of about 1000 to 20,000 which resin is the addition reaction product of
      (a) 40-90 parts by weight of a diglycidyl ether of a dihydric phenol,
      (b) 5-35 parts by weight of a dihydric phenol,
      (c) 2-15 parts by weight of a diglycidyl ether of a polyoxyalkylene glycol, and
      (d) 2-15 parts by weight of an alkyl phenol-formaldehyde novolac resin wherein the alkyl group contains 4 to 12 carbon atoms.

2. An epoxy resin dispersion in accordance with claim 1 wherein the diglycidyl ether of the dihydric phenol (a) is the diglycidyl ether of Bisphenol A.

3. An epoxy resin dispersion in accordance with claim 1 wherein the dihydric phenol (b) is Bisphenol A.

4. An epoxy resin dispersion in accordance with claim 1 wherein the diglycidyl ether of a polyoxyalkylene glycol (c) is the diglycidyl ether of a polyoxyethylene-propylene glycol.

5. An epoxy resin dispersion in accordance with claim 1 wherein the novolac resin is a nonylphenol-formaldehyde novolac resin.

6. An epoxy resin dispersion in accordance with claim 1 which contains about 1 to about 25 weight percent, based on resin solids weight, of water-immiscible $C_8$-$C_{20}$ aliphatic monoepoxide reactive diluent.

7. An epoxy resin dispersion in accordance with claim 6 wherein the monoepoxide diluent is a glycidyl ether of a monohydric $C_8$-$C_{17}$ aliphatic alcohol.

8. An epoxy resin dispersion in accordance with claim 6 which contains about 5 to about 20 weight percent, based on resin solids weight, of water-miscible solvent selected from 2 to 8 carbon glycols or glycol ethers.

9. The epoxy resin dispersion in accordance with claim 8 wherein the solvent is ethylene glycol monopropyl ether.

10. An epoxy resin dispersion in accordance with claim 1 which contains about 5 to about 20 weight percent, based on resin solids weight, of water-miscible solvent selected from 2 to 8 carbon glycols or glycol ethers.

11. An epoxy resin dispersion in accordance with claim 10 wherein the solvent is ethylene glycol monopropyl ether.

* * * * *